United States Patent
Walker et al.

(10) Patent No.: US 10,510,010 B1
(45) Date of Patent: Dec. 17, 2019

(54) METHODS FOR AUTOMATICALLY GENERATING ACCURATE MODELS IN REDUCED TIME

(71) Applicant: Liquid Biosciences, Inc., Aliso Viejo, CA (US)

(72) Inventors: Beau Walker, Irvine, CA (US); Michael Colbus, Upland, CA (US); Reece Colbus, Upland, CA (US); Hunter Colbus, Upland, CA (US); Patrick Lilley, Aliso Viejo, CA (US)

(73) Assignee: Liquid Biosciences, Inc., Aliso Viejo, CA (US)

( * ) Notice: Subject to any disclaimer, the term of this patent is extended or adjusted under 35 U.S.C. 154(b) by 0 days.

(21) Appl. No.: 15/730,623

(22) Filed: Oct. 11, 2017

(51) Int. Cl.
*G06F 15/18* (2006.01)
*G06N 5/04* (2006.01)
*G06N 3/12* (2006.01)

(52) U.S. Cl.
CPC .............. *G06N 5/043* (2013.01); *G06N 3/126* (2013.01)

(58) Field of Classification Search
CPC ...................................................... G06F 19/24
USPC ...................................................... 706/15, 45
See application file for complete search history.

(56) References Cited

U.S. PATENT DOCUMENTS

| | | |
|---|---|---|
| 6,081,766 A | 6/2000 | Chapman et al. |
| 2007/0088534 A1 | 4/2007 | MacArthur et al. |
| 2009/0254971 A1* | 10/2009 | Herz ...................... G06Q 10/10 726/1 |
| 2015/0278694 A1* | 10/2015 | Kobayashi ........... G06N 99/005 706/12 |
| 2016/0180240 A1* | 6/2016 | Majumdar ............. G06N 7/005 706/46 |
| 2016/0189558 A1 | 6/2016 | McGann et al. |
| 2017/0124487 A1* | 5/2017 | Szeto ................ G06Q 30/0204 |

FOREIGN PATENT DOCUMENTS

WO 2008027912 A2 3/2008

OTHER PUBLICATIONS

Alobaidi, W., Sandgren, E. and Alkuam, E. (2017) Decision Support through Intelligent Agent Based Simulation and Multiple Goal Based Evolutionary Optimization. Intelligent Information Management, 9, 97-113. Published May 26, 2017; https://doi.org/10.4236/iim.2017.93005.

Gordon, Deborah M.; The Ecology of Collective Behavior; PLOS Biology, vol. 12, Issue 3; Published Mar. 11, 2014.

Masad, David; Mesa:An Agent-Based Modeling Framework; Proc. of the 14th Python in Science Conf, 2015; pp. 53-60; https://www.youtube.com/watch?v=1cySLoprPMc.

(Continued)

*Primary Examiner* — David R Vincent
(74) *Attorney, Agent, or Firm* — Entralta P.C.; Justin G. Sanders; Peter D. Weinstein (57) ABSTRACT

This invention comprises a method of simulating an ecological environment, where digital agents within the environment are capable of processing data, and agents that successfully process data are permitted to reproduce to generate new algorithms. The invention is a groundbreaking advance in artificial intelligence and machine learning and enables processes that were once considered computationally impossible.

14 Claims, 11 Drawing Sheets

(56) References Cited

OTHER PUBLICATIONS

Peck, Steven L.; Department of Integrative Biology, Brigham Young University; Trends in Ecology and Evolution, vol. 19, No. 10, Oct. 2004; www.sciencedirect.com.
Projectmesa/mesa; https://github.com/projectmesa/mesa/blob/master/mesa/datacollection.py; 2017 Github,Inc.
https://github.com/projectmesa/mesa/blob/master/mesa/batchrunner.py; 2017 Github, Inc.
https://github.com/projectmesa/mesa/blob/master/mesa/space.py; 2017 Github, Inc.
International Search Report and Written Opinion, PCT/US2017/056218, dated Jul. 31, 2018.

* cited by examiner

```
class Grid:
    Grid cells are indexed by [x][y], where [0][0] is assumed to be the
    bottom-left and [width-1][height-1] is the top-right. If a grid is
    toroidal, the top and bottom, and left and right, edges wrap to each other Properties:
        width, height: The grid's width and height.
        torus: Boolean which determines whether to treat the grid as a torus.
        grid: Internal list-of-lists which holds the grid cells themselves.

Methods:
        get_neighbors: Returns the objects surrounding a given cell.
        get_neighborhood: Returns the cells surrounding a given cell.
        get_cell_list_contents: Returns the contents of a list of cells
            ((x,y) tuples)
        neighbor_iter: Iterates over position neighbors.
        coord_iter: Returns coordinates as well as cell contents.
        place_agent: Positions an agent on the grid, and set its pos variable.
        move_agent: Moves an agent from its current position to a new position.
        iter_neighborhood: Returns an iterator over cell coordinates that are
            in the neighborhood of a certain point.
        torus_adj: Converts coordinate, handles torus looping.
        out_of_bounds: Determines whether position is off the grid, returns
            the out of bounds coordinate.
        iter_cell_list_contents: Returns an iterator of the contents of the
            cells identified in cell_list.
        get_cell_list_contents: Returns a list of the contents of the cells
            identified in cell_list.
        remove_agent: Removes an agent from the grid.
        is_cell_empty: Returns a bool of the contents of a cell.
```

```
class DataCollector:
    model = None
    def collect(self, model):
        if self.model_reporters:
            for var, reporter in self.model_reporters.items():
                self.model_vars[var].append(reporter(model))
        if self.agent_reporters:
            for var, reporter in self.agent_reporters.items():
                agent_records = []
                for agent in model.schedule.agents:
                    agent_records.append((agent.unique_id, reporter(agent)))
                self.agent_vars[var].append(agent_records)
    def add_table_row(self, table_name, row, ignore_missing=False):
        if table_name not in self.tables:
            raise Exception("Table does not exist.")
        for column in self.tables[table_name]:
            if column in row:
                self.tables[table_name][column].append(row[column])
            elif ignore_missing:
                self.tables[table_name][column].append(None)
            else:
                raise Exception("Could not insert row with missing column")
    def get_model_vars_dataframe(self):
        return pd.DataFrame(self.model_vars)
    def get_agent_vars_dataframe(self):
        data = defaultdict(dict)
        for var, records in self.agent_vars.items():
            for step, entries in enumerate(records):
                for entry in entries:
                    agent_id = entry[0]
                    val = entry[1]
                    data[(step, agent_id)][var] = val
        df = pd.DataFrame.from_dict(data,       ="index")
        df.index.names = ["Step", "AgentID"]
        return df
    def get_table_dataframe(self, table_name):
        if table_name not in self.tables:
            raise Exception("No such table.")
        return pd.DataFrame(self.tables[table_name])
```

```
class BatchRunner:
    Create a new BatchRunner for a given model with the given
    parameters.
    Args:
        model_cls: The class of model to batch-run.
        variable_parameters: Dictionary of parameters to lists of values.
            The model will be run with every combination of these paramters.
            For example, given variable_parameters of
                {"param_1": range(5),
                 "param_2": [1, 5, 10]}
            models will be run with {param_1=1, param_2=1},
                {param_1=2, param_2=1}, ..., {param_1=4, param_2=10}.
        fixed_parameters: Dictionary of parameters that stay same through
            all batch runs. For example, given fixed_parameters of
                {"constant_parameter": 3},
            every instantiated model will be passed constant_parameter=3
            as a kwarg.
        iterations: The total number of times to run the model for each
            combination of parameters.
        max_steps: The upper limit of steps above which each run will be halted
            if it hasn't halted on its own.
        model_reporters: The dictionary of variables to collect on each run at
            the end, with variable names mapped to a function to collect
            them. For example:
                {"agent_count": lambda m: m.schedule.get_agent_count()}
        agent_reporters: Like model_reporters, but each variable is now
            collected at the level of each agent present in the model at
            the end of the run.
        display_progress: Display progresss bar with time estimation?
            ...
```

```
def run_all(self):
    """ Run the model at all parameter combinations and store results. """
    param_names, param_ranges = zip(*self.variable_parameters.items())
    run_count = count()
    total_iterations = self.iterations
    for param_range in param_ranges:
        total_iterations *= len(param_range)
    with tqdm(total_iterations,          =not self.display_progress) as pbar:
        for param_values in product(*param_ranges):
            kwargs = dict(zip(param_names, param_values))
            kwargs.update(self.fixed_parameters)
            model = self.model_cls(**kwargs)
            for _ in range(self.iterations):
                self.run_model(model)
                # Collect and store results:
                model_key = param_values + (next(run_count),)
                if self.model_reporters:
                    self.model_vars[model_key] = self.collect_model_vars(model)
                if self.agent_reporters:
                    agent_vars = self.collect_agent_vars(model)
                    for agent_id, reports in agent_vars.items():
                        agent_key = model_key + (agent_id,)
                        self.agent_vars[agent_key] = reports
                pbar.update()

def _prepare_report_table(self, vars_dict, extra_cols=None):
    """
    Creates a dataframe from collected records and sorts it using 'Run'
    column as a key.
    """
    extra_cols = ['Run'] + (extra_cols or [])
    index_cols = list(self.variable_parameters.keys()) + extra_cols
    records = []
    for param_key, values in vars_dict.items():
        record = dict(zip(index_cols, param_key))
        record.update(values)
        records.append(record)
    df = pd.DataFrame(records)
    rest_cols = set(df.columns) - set(index_cols)
    ordered = df[index_cols + list(sorted(rest_cols))]
    ordered.sort_values(  ='Run',          =True)
    return ordered
```

1002

METHODS FOR AUTOMATICALLY GENERATING ACCURATE MODELS IN REDUCED TIME

FIELD OF THE INVENTION

The field of the invention is methods for automatically generating accurate models in reduced time.

BACKGROUND

The background description includes information that may be useful in understanding the present invention. It is not an admission that any of the information provided in this application is prior art or relevant to the presently claimed invention, or that any publication specifically or implicitly referenced is prior art.

It has been recognized that simulations of biological processes defined by simple rules for individual actors within the simulation may yield complex emergent behavior. It has yet to be appreciated that actors within a simulation of biological processes may represent computer processing rules and algorithms, and a simulation of an evolutionary process containing those rules and algorithms may yield useful complex algorithms for providing useful predictions among sets of data.

Steven L. Peck, "Simulation as experiment: a philosophical reassessment for biological modeling," for example, describes several uses of simulations in an ecological context: simulations may be used to model "digital" life, in which creatures are allowed to compete, reproduce, and evolve in a computer "environment"; simulations may also be appropriate to model processes that "are inescapably complex." Similarly, a python implementation of agent-based modeling exists, project Mesa, which is licensed under the Apache License, Version 2.0 (available at http://www.apache.org/licenses/LICENSE-2.0). Neither Peck nor Project Mesa teaches or suggests that simulations can be used as a tool to simulate the process of model generation itself, in which digital agents in a simulation comprise algorithms capable of predicting outcomes based on data, and where agents can mate with similar digital agents to generate improved algorithms for predicting outcomes based on data.

Thus, there is still a need for improved model generation that can take advantage of advances in agent-based modeling environments.

SUMMARY OF THE INVENTION

The present invention provides a method of agent-based modeling as a framework for evolutionary development of genetic algorithms. The methods and apparatuses described herein have many desirable qualities, including: (1) they allow emergent behavior of a simulation to identify "bad" data—a task that computers generally perform poorly if at all; (2) they generate new and useful algorithms at a faster rate than conventional algorithmic generation methods; (3) they generate new and useful algorithms that conventional algorithmic generation methods would be incapable of generating without human intervention; (4) they generate new and useful algorithms that neither conventional algorithmic generation methods nor human invention could generate.

The described embodiments serve to illustrate the invention.

In one embodiment of the invention, a method of generating an algorithm to process data is provided. The method comprises creating a first agent and a second agent within a digital environment, wherein the first agent comprises a first algorithm capable of processing data and an agent attribute, and the second agent comprises a second algorithm capable of processing data; generating a predicted outcome based on applying the first algorithm to a feature of a set of data, wherein the set of data comprises the feature and an outcome; comparing the predicted outcome to the outcome of the set of data; modifying an attribute of the first agent based on the comparison; and combining, based on the modified attribute of the first agent, the first and the second algorithms to create a third algorithm.

In another embodiment of the invention, an algorithmic generator is provided. The algorithmic generator comprises a computing device configured to create a first and second agent within a digital environment, wherein the first agent comprises a first algorithm capable of processing data and an agent attribute and the second agent comprises a second algorithm capable of processing data; process a set of data comprising a feature and an outcome with the first algorithm, thereby generating a predicted outcome; compare the predicted outcome to the outcome of the set of data; determine, based on the comparison result, whether to modify an attribute of the first agent; and determine, based on factors comprising the attribute of the first agent, whether to generate a third algorithm based on the first algorithm.

In yet another embodiment of the invention, a method to simulate algorithmic generation is provided, comprising the steps of: creating an agent within a digital environment, wherein the agent comprises an algorithm capable of processing data, and wherein the algorithm comprises algorithmic components; processing a set of data comprising a feature and an outcome with the algorithm, thereby generating a predicted outcome; comparing the predicted outcome to the outcome of the set of data; and determining, based on the comparison result, whether to generate, based on the algorithmic components and a mutation parameter, a second algorithm capable of processing data.

It should be appreciated that the disclosed subject matter provides advantageous technical effects including improved operation of a computer by dramatically decreasing computational cycles required to perform certain tasks (e.g., genetic programming). In the absence of the inventive subject matter, genetic programming is not a tenable solution in many situations due in large part to its steep computational requirements that would necessitate sometimes months and years of computing time to, for example, develop models as in embodiments of the inventive subject matter.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 10 depicts a computer listing implementing a software method for running a batch of simulations.

DETAILED DESCRIPTION

Definitions

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

It should be noted that any language directed to a computer should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

As used in this application, terms like "set" or "subset" are meant to be interpreted to include one or more items. It is not a requirement that a "set" include more than one item unless otherwise noted. In some contexts, a "set" may even be empty and include no items.

The present invention's many embodiments serve to illustrate the invention.

The invention comprises a digital environment in which digital agents may process data (represented as another type of digital agent) and reproduce, where reproduction occurs based on success processing data. The invention provides groundbreaking advantages over prior art systems. The invention described herein (1) allows emergent behavior of a simulation to identify "bad" data—a task that computers generally perform poorly, if at all; (2) generates new and useful algorithms at a faster rate than conventional algorithmic generation methods; (3) generates new and useful algorithms that conventional algorithmic generation methods would be incapable of generating without human intervention; and (4) generates new and useful algorithms that neither conventional algorithmic generation methods nor human invention would generate. For example, successful digital agents are more likely to reproduce, and the combination of successful agents yields algorithms capable of greater explanatory power. Likewise, datasets that are more difficult to process can become apparent because, in some embodiments, successful digital agents will tend to avoid those datasets.

Digital Environment

First described is the invention's digital environment. The digital environment may comprise any computer hardware or software capable of operating the invention described in this application. The digital environment comprises all digital processing aspects of the invention. It is alternately referred to as a digital ecology.

Scheduler

One component of the invention is a scheduler, which is capable of activating agents. The scheduler, described in more detail below, is a module that controls what agents are activated and "when" within the digital ecology.

Figure 1:
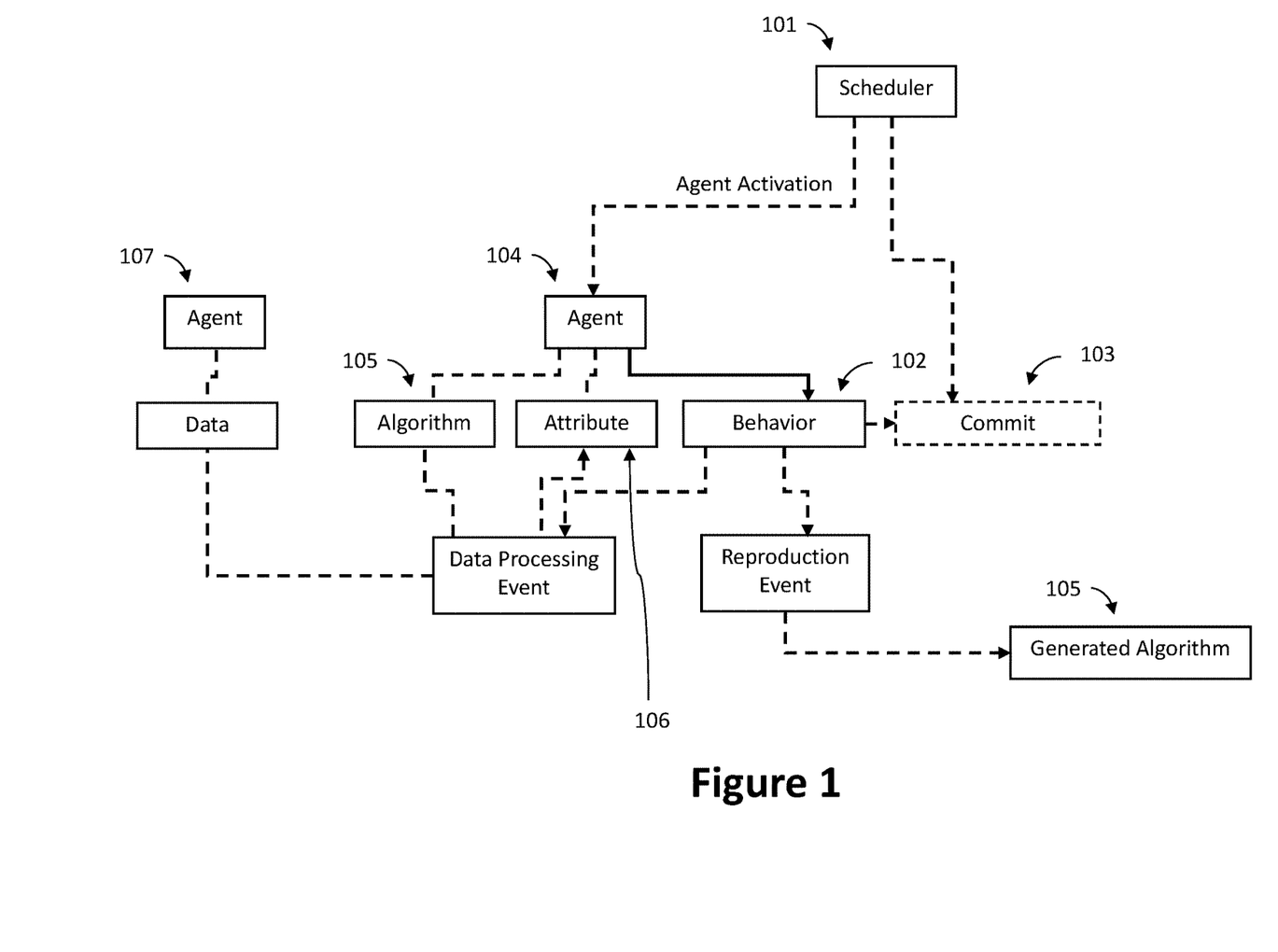
FIG. 1 shows a scheduler and associated process flow.

A simulation may advance time in discrete "ticks." These ticks may optionally be associated with a continuous clock, such that a defined number of ticks occurs per second/minute/hour/etc. Scheduler 101 may thus activate agents based on the number of elapsed ticks.

In one embodiment, scheduler comprises a variable for tracking the number of "ticks" which have elapsed in the simulation. Other embodiments may also comprise a variable for tracking the time.

FIG. 1 depicts one embodiment of a scheduler and associated process. Scheduler 101 further comprises a list of agents capable of activation. FIG. 1 depicts agent 104, which is described in greater detail below.

Scheduler 101 may further comprise a method to add an agent and a method to remove an agent from the list of agents. Scheduler 101 method to add an agent comprises software code to add to the list of agents to activate, while the method to remove an agent comprises software code to remove an agent from the list of agents to activate. In some embodiments, these methods may be implemented through permitting other modules to access the list of agents and modify the list.

Scheduler 101 further comprises a method, which comprises software code to activate agents in scheduler 101's list of agents. Agent 104's behavior on activation is described in greater detail below. In some embodiments, when an agent is activated, changes may be "staged," meaning that changes to the agent's properties are calculated, but not yet applied. In FIG. 1, commit stage 103 depicts applying changes in a behavior activation stage. Commit stage 103 permits agents to be activated in a simultaneous simulation, rather than sequentially—applying changes after they are staged.

In other embodiments, agents may be activated in phases. FIG. 1 depicts one phase, behavior 102. In these other embodiments, scheduler 101 would first activate behavior 102 for scheduler agents, then activate a second behavior (not depicted in FIG. 1) for scheduler agents after processing of behavior 102. For example, an agent may comprise a first activation phase, which determines a first property based on a first parameter, and a second activation phase, which determines a second property based on a second parameter. Additional phases are similarly possible.

Scheduler 101 thereby determines simulation behavior when the simulation advances one or more "ticks." It may be advantageous, in some embodiments, to activate all agents by sequential iteration through the list of agents. In other embodiments, random iteration through the list of agents may be advantageous. And in other embodiments, it may be advantageous to activate agents simultaneously.

Space

In some embodiments, the invention comprises a space module, which comprises software code for simulating the space through which agents move. In one embodiment, the space module comprises width, height, torus, and/or grid properties. The width and height properties determine a width and height for the simulated grid. The torus property determines whether the grid will be simulated as a torus. The grid property comprises a list comprising the contents of the cells in the grid.

The space module further comprises methods for determining aspects of the simulated space. In some embodiments, these methods may be implemented outside the space module through access to the variables described in the space module. These methods comprise methods for getting neighbors, getting neighborhood, getting cell contents, iterating over cell neighbors, determining coordinates, placing agents, moving agents, determining torus wrapping, determining whether coordinates are out of bounds, iterating over the contents of cells identified in a list, getting cell list contents, removing agents, and determining whether a cell is empty. It will be appreciated by one of skill in the art that not all methods are necessary to achieve a module that comprises software code for determining aspects of the simulated space.

Example software code illustrates one implementation of the space module. Other implementations, of course, are possible.

Figure 7:
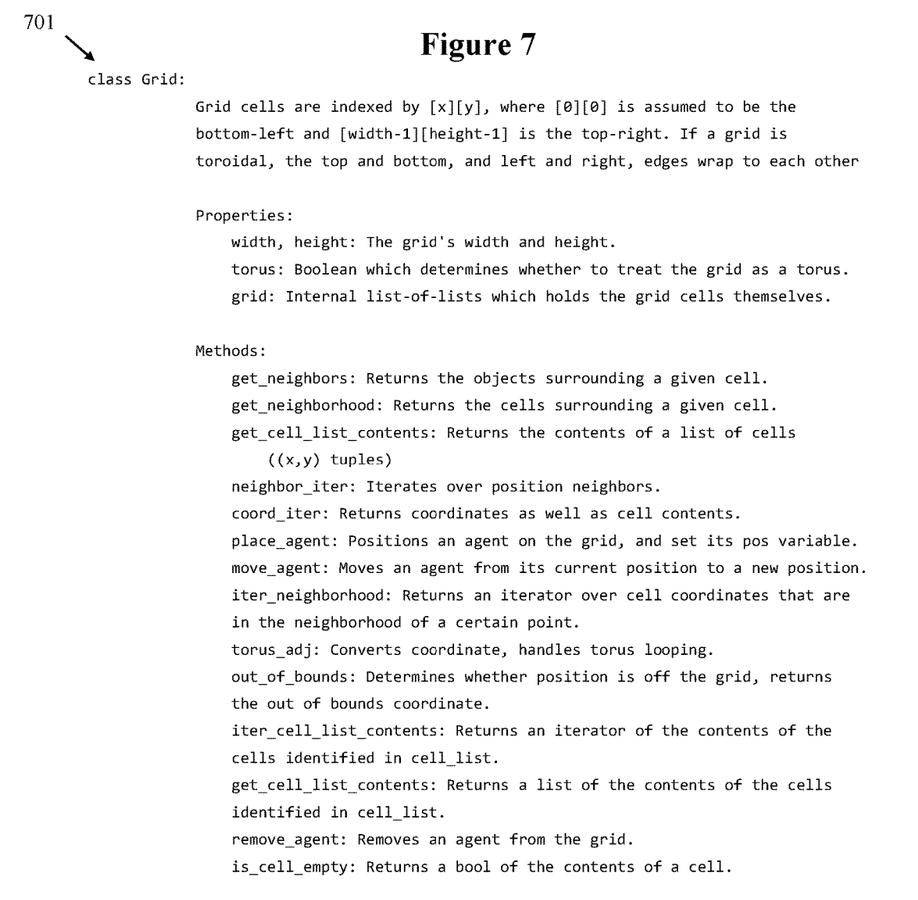
FIG. 7 depicts a software specification of a virtual space as used in aspects of the invention.

FIG. 7 shows an example specification for a space module, from Mesa, according to the invention. Grid class 701 depicts properties and methods of a programming object that can be used according to an aspect of the invention.

By use of the space module, digital spatial coordinates may be associated with agents in some embodiments of the invention.

Data Collection

Some embodiments of the invention may further comprise a data collector module which comprises software code for collecting data generated by the simulation. A data collection module like the one in Mesa is suitable for use with the present invention. One embodiment of the data collection module is provided below to illustrate the model by example. It will be appreciated by one of skill in the art that other embodiments are possible.

Figure 8:
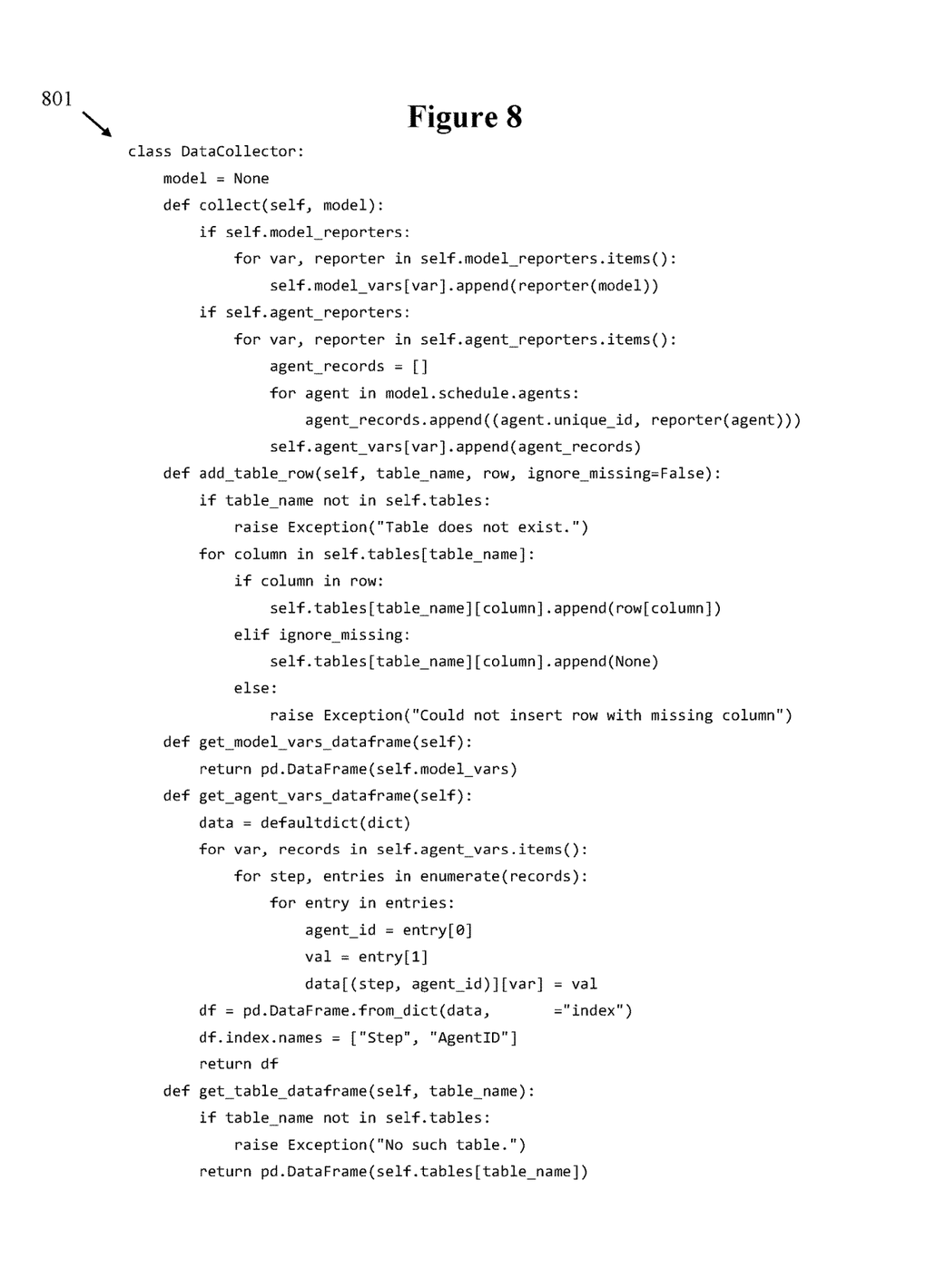
FIG. 8 depicts a computer listing defining a data collection tool as used in aspects of the invention.

FIG. 8 shows an example of software code implementing one example of a data collection module. Data collector class 801 provides a programming object suitable for performing several useful functions for data collection, including iteration, data collection, and helper functions such as add_table_row.

Batch Runner

Some embodiments of the invention may further comprise a batch runner module, which comprises software code for initializing at least two runs of a simulation with a first set of parameters in a first run and a second set of parameters in a second run.

Figure 9:
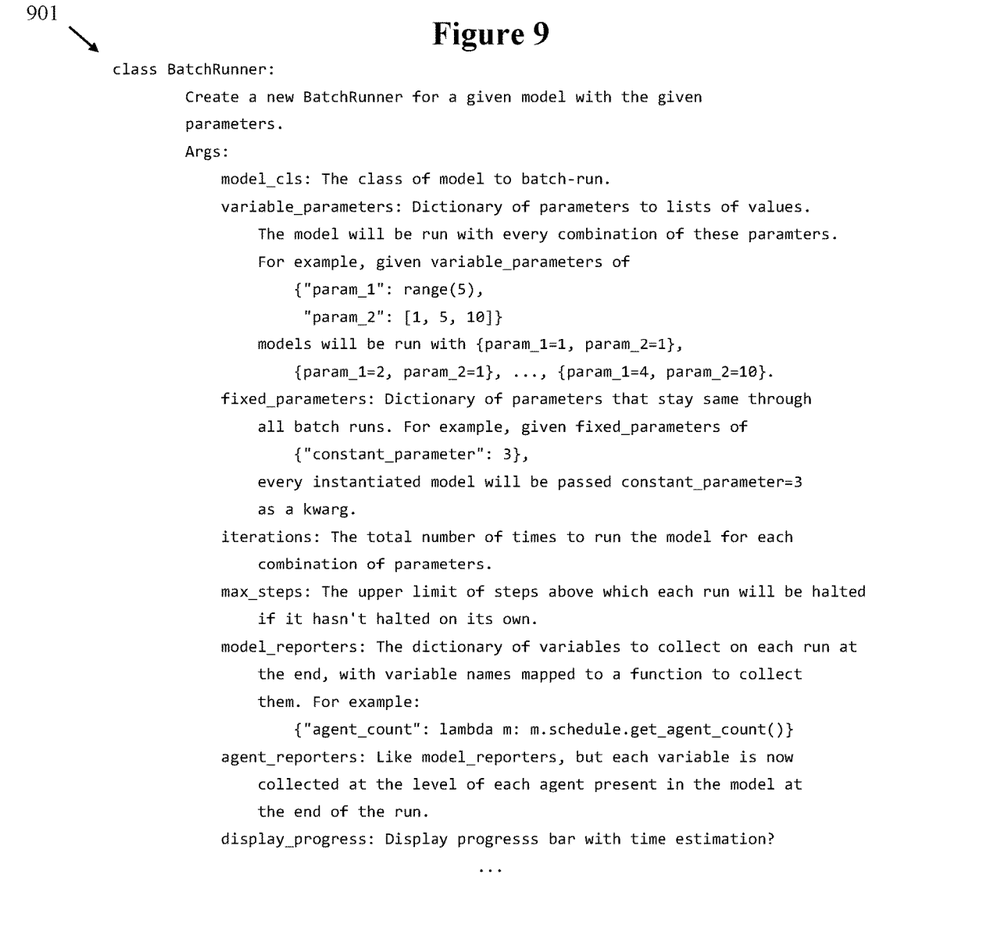
FIG. 9 depicts a software specification defining a software method for running a batch of simulations.

A batch runner provided by Mesa may be suitable for use with the present invention. FIG. 9 depicts an example software code specification, such as that provided by Mesa, for a batch runner for performing runs of a simulation as described above. Argument specification for BatchRunner 901 illustrates possibilities for batch running parameters. FIG. 10 depicts an example implementation of software code, such as that provided by Mesa, for performing simulations as described above, as well as for recording data provided by the simulation. Run_all function 1001 provides a software method for running a batch of simulations given simulation start parameters and storing results. _prepare_report_table function 1002 provides a helper function for storing data provided by a data collection module.

Agent

The invention further comprises an agent, which comprises software code for storing an agent attribute and determining agent behavior. FIG. 1 depicts one such embodiment comprising agent 104, which comprises an algorithm 105 capable of processing data. Agent 104 also comprises an attribute 106, which may be termed "agent energy." Agent 104 may also comprise additional attributes, e.g., a mutation parameter. Agent attributes need not be identical for all agents in a simulation. For example, some agents may have an attribute for data comprising a feature and an outcome, while other agents may lack an attribute for data comprising a feature and an outcome.

In one embodiment, the software code for determining agent behavior implements a "step" function, which is invoked when an agent is activated. In FIG. 1, the "step" function is behavior 102, which may access agent attributes and determine agent behavior based on agent attributes. The step function, at either the agent level or above, is capable of causing a data processing event or a reproduction event for an agent. For example, in FIG. 1, behavior 102 determines whether to invoke a data processing event or a reproduction event. Many different determinations are possible in many embodiments. For example, one method of determination is based on coordinates associated with an agent in digital simulated space, in which a data processing event is invoked when an agent comprising an algorithm, e.g. agent 104, is sufficiently close in digital simulated space to an agent comprising data, e.g. agent 107.

Figure 2:
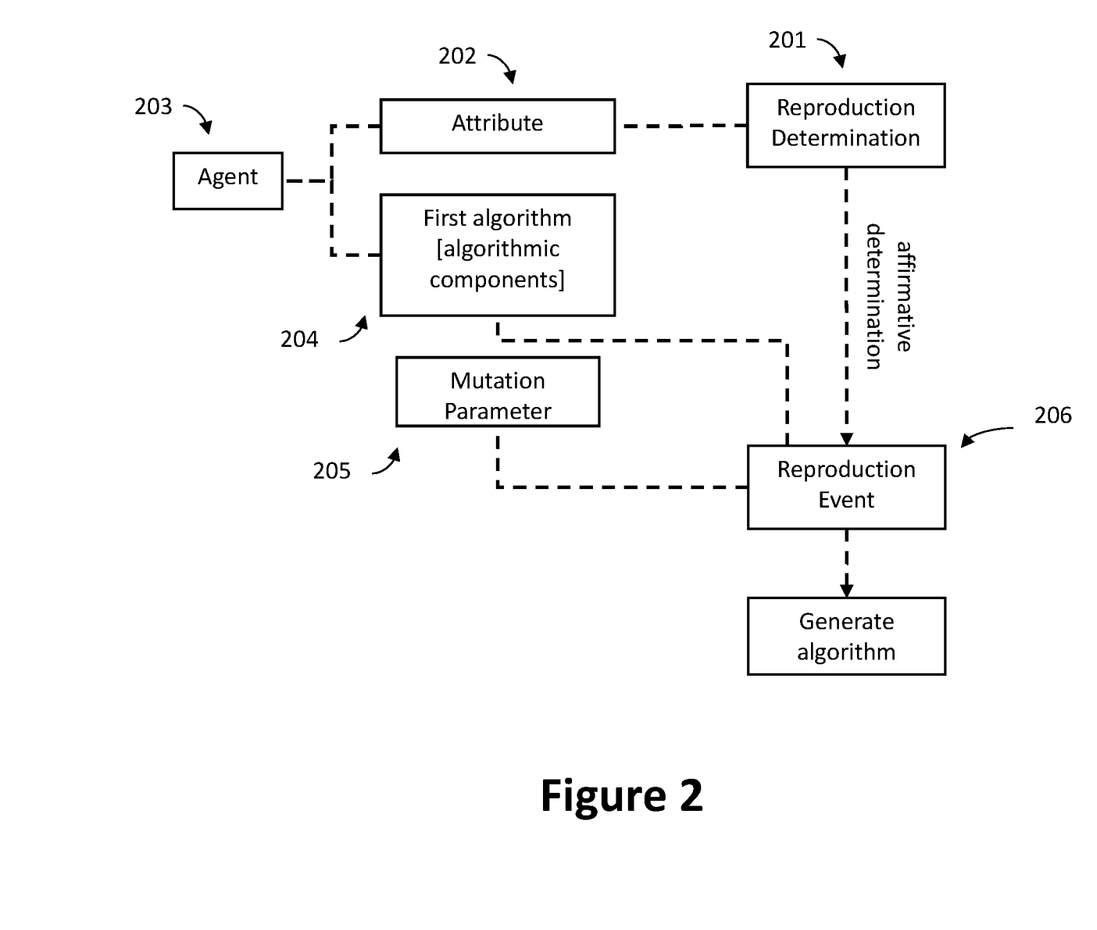
FIG. 2 shows process flow and associations for a reproduction event.

Agent 104 further comprises software code for a reproduction event, and may also comprise software code for determining whether to cause a reproduction event within behavior 102. The determination is made based on at least one agent attribute, e.g. agent energy. For example, if agent energy is compared to a threshold energy determined to be required to reproduce, and the comparison result is that the agent energy is below the threshold, no reproduction event is caused.

FIG. 2 depicts reproduction event determination and reproduction event process flow. As depicted in FIG. 2, reproduction determination 201 is based on an attribute 202 of agent 203, wherein agent 203 also comprises first algorithm 204 (comprising algorithmic components). Agent 203 may also comprise a mutation parameter 205, but mutation parameter 205 may also be a property of another object. If an affirmative determination is made, reproduction event 206 is invoked with first algorithm 204 and mutation parameter 205.

The reproduction event comprises software for generating an agent attribute comprising an algorithm capable of processing data based on (1) the agent algorithm capable of processing data and a second agent algorithm capable of processing data, and, optionally, a mutation parameter or (2) the agent algorithm capable of processing data and a mutation parameter. The mutation parameter, if present, determines the degree of randomization in the generated agent attribute algorithm.

Reproduction Event

A reproduction event generates an algorithm capable of processing data. As described above, the generation is based on (1) the agent algorithm capable of processing data and a second agent algorithm capable of processing data, and, optionally, a mutation parameter or (2) the agent algorithm capable of processing data and a mutation parameter.

The algorithm capable of processing data comprises algorithmic components, which can include, for example: computational operators (e.g., logical statements like IF, AND, OR), mathematical operators (e.g., arithmetic operations like multiplication, division, subtraction, and addition; trigonometric operations; logistic functions; calculus operations; "floor" or "ceiling" operators; or any other mathematical operators), constants (e.g., a constant numerical value, including integers or values like pi), a predictor (e.g., observed or measured values or formulas), features (e.g., characteristics), variables, ternary operators (e.g., an operator that takes three arguments where the first argument is a comparison argument, the second is the result upon a true comparison, and the third is the result upon a false comparison), algorithms, formulas, literals, functions (e.g., unary functions, binary functions, etc.), binary operators (e.g., an operator that operates on two operands and manipulates them to return a result), weights and weight vectors, nodes and hidden nodes, gradient descent, sigmoidal activation functions, hyper-parameters, and biases.

To generate an algorithm capable of processing data based on a first agent algorithm capable of processing data and a second agent algorithm capable of processing data, and, optionally, a mutation parameter, algorithmic components of the first agent algorithm and algorithmic components of the second agent algorithm are grouped in a common pool. The generated agent algorithm is based on algorithmic components selected from this common pool, together with algorithmic components selected from a second set of algorithmic components, where drawing of components from the second set of algorithmic components is based on the mutation parameter.

To generate an algorithm capable of processing data based on a first agent algorithm capable of processing data without a second agent algorithm, algorithmic components of the first agent algorithm are selected for the generated agent algorithm, together with algorithmic components selected from a second set of algorithmic components, where drawing of components from the second set of algorithmic components is based on the mutation parameter.

For example, according to the process depicted in FIG. 2, the reproduction event 206 generates an algorithm wherein algorithmic components of the first algorithm 204 are combined or modified with algorithmic components of a broader set of algorithmic components, wherein the likelihood of adding an algorithmic component from the common pool is determined by mutation parameter 205.

Figure 2A:
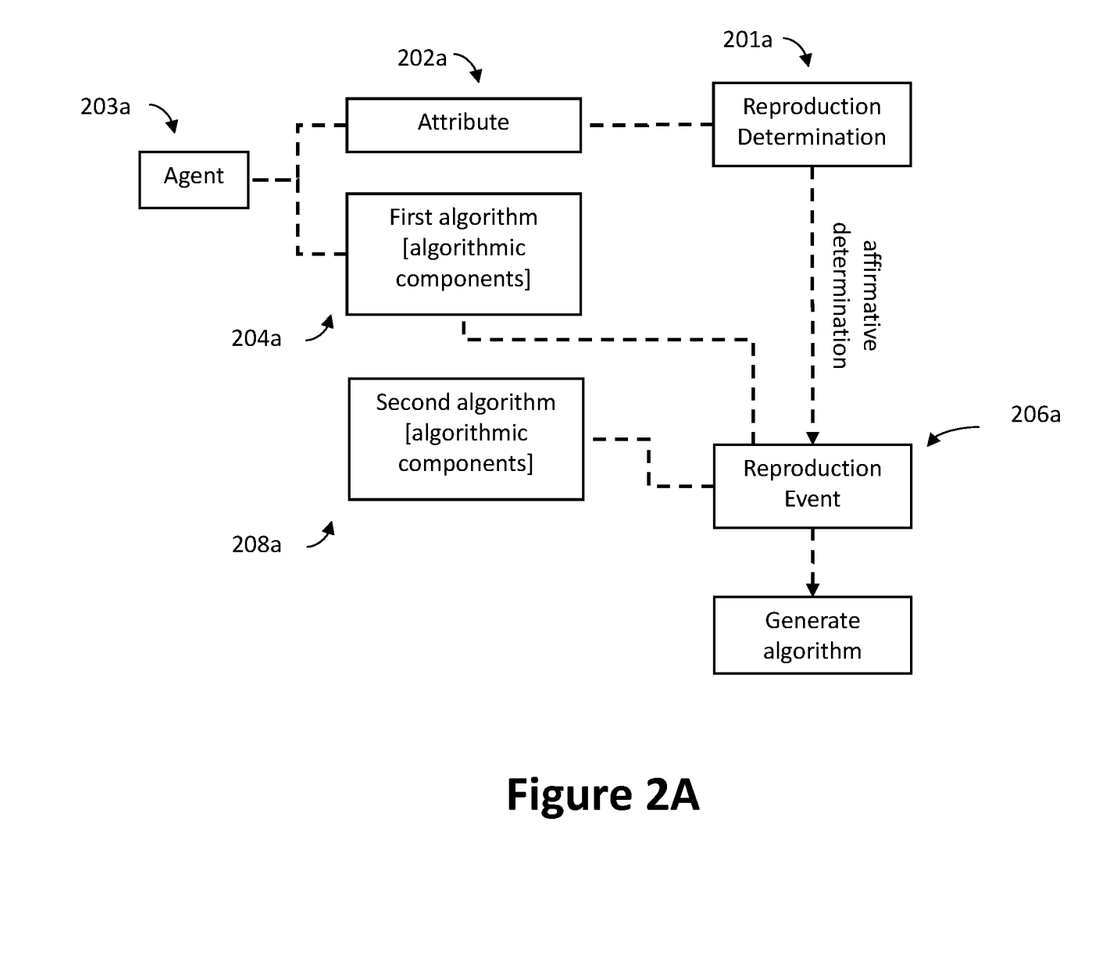
FIG. 2a shows process flow and associations for an alternative reproduction event.

For a further example, according to the reproduction event depicted in FIG. 2A, reproduction event 206a generates an algorithm comprising generated algorithmic components, wherein the generated algorithmic components are selected from the set of algorithmic components comprising the first algorithm 204a's algorithmic components and the second algorithm 208a's algorithmic components.

Data Processing Event

The invention further comprises a data processing event, which comprises software code for applying an agent algorithm to data, which comprises one or more features and an outcome. The agent algorithm generates a predicted outcome based on the one or more features, and the predicted outcome is then compared to the outcome of the data. An agent attribute of the agent comprising the agent algorithm is then modified, based on the result of the comparison. For example, if the predicted outcome is equal to the outcome of the data, the energy attribute of the agent may be increased.

Figure 3:
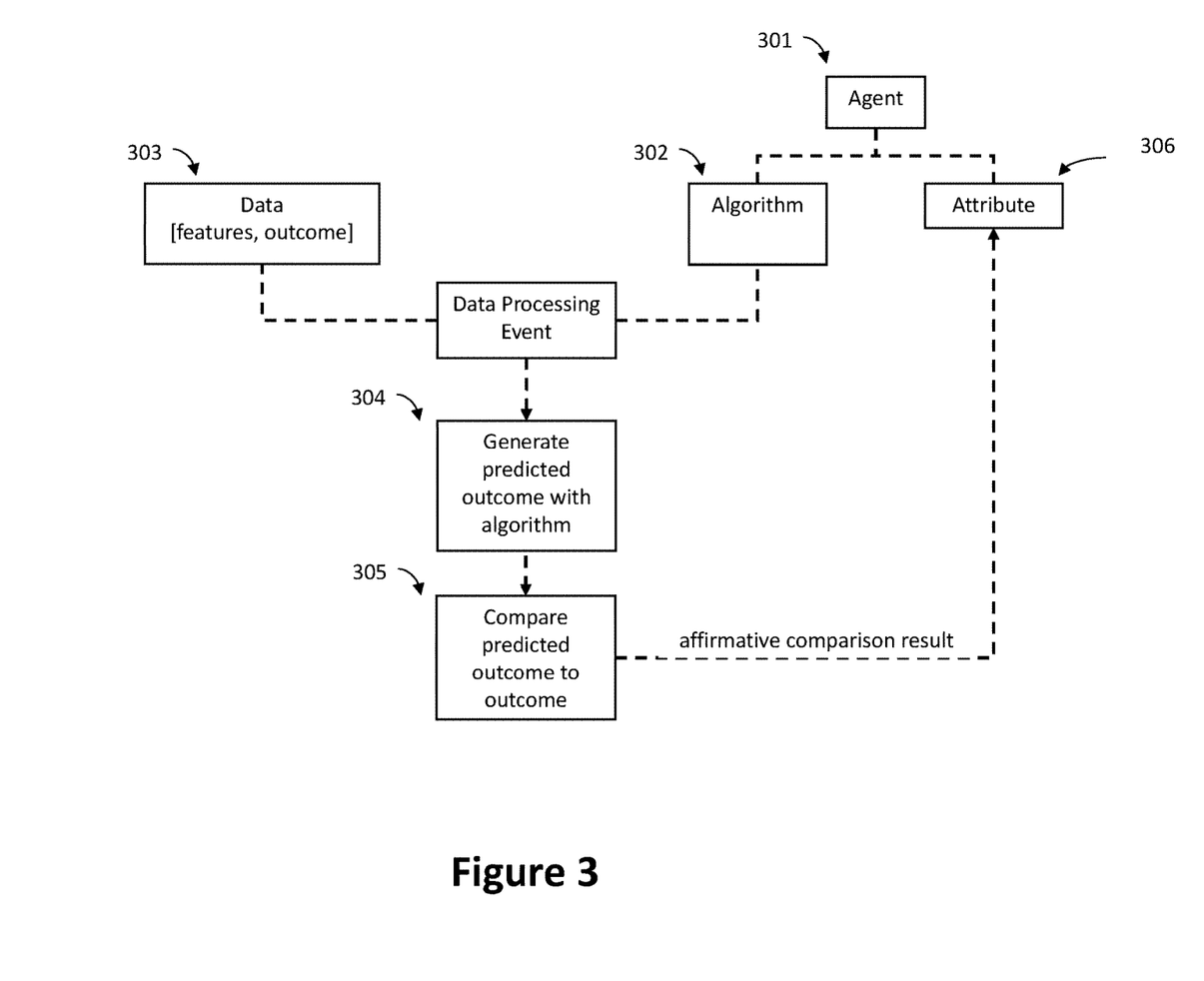
FIG. 3 shows process flow and associations for a data processing event.

For example, FIG. 3 depicts a data processing event process flow. The data processing event accesses both data 303 and algorithm 302 of agent 301. Algorithm 302 is applied to the features of data 303 to generate a predicted outcome, which is then compared to the outcome of data 303 at step 305. In the affirmative case of a comparison result, attribute 306 of agent 301 is modified thereby as a result of the comparison.

Visualization Module

Optionally, the invention may comprise a visualization module to depict a visualization of the simulation. The visualization module comprises both a visualizer module, comprising software for converting data collected by the data collector into a graphical depiction. The visualizer further comprises a hardware display device, to display the graphical depiction, e.g., a liquid crystal display, light emitting diode display, cathode ray tube display, electroluminescent display, electronic paper display, etc. In embodiments comprising a grid simulation, the visualizer causes grid coordinates to be translated to screen coordinates, displaying a visual depiction of the contents of grid cells in a corresponding location on screen.

Exemplary Embodiment Processes

Figure 4:
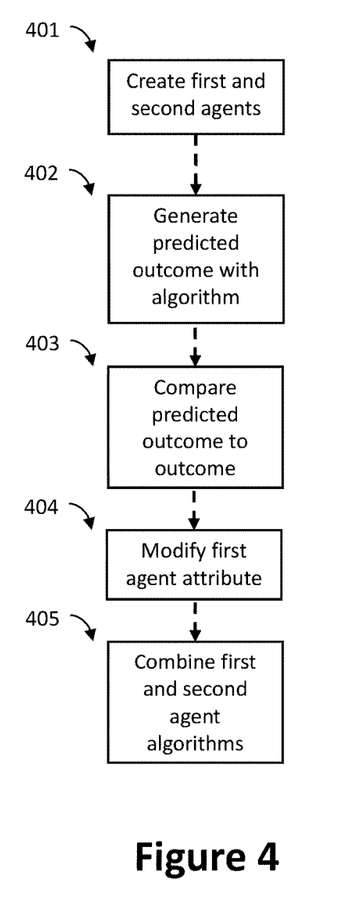
FIGS. 4, 5, and 6 depict exemplary processes according to the invention.
Figure 5:
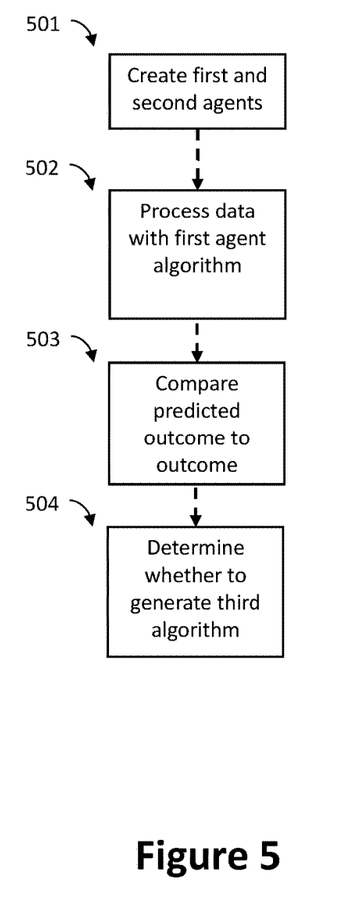
Figure 6:
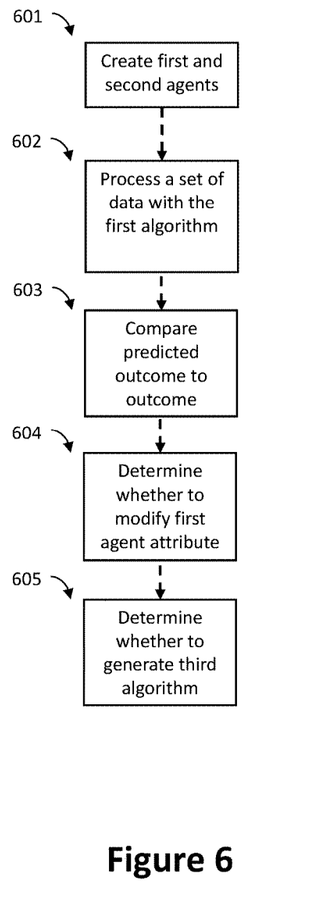

It is appreciated from this application that the exemplary processes depicted in FIGS. 4, 5, and 6 embody the invention. FIG. 4 depicts an embodiment of the invention comprising several steps. Step 401 comprises creating a first agent and a second agent within a digital environment. The first agent comprises a first algorithm capable of processing data and an agent attribute. The second agent comprises a second algorithm capable of processing data. As described above, the first agent may be associated with a digital spatial coordinate. Step 402 comprises generating a predicted outcome based on applying the first algorithm to a feature of a set of data, wherein the set of data comprises the feature and an outcome. Step 403 comprises comparing the predicted outcome to the outcome of the set of data. Step 404 comprises modifying an attribute of the first agent based on the comparison. Step 405 comprises combining, based on the modified attribute of the first agent, the first and the second algorithms to create a third algorithm. As will be appreciated by one of skill in the art, steps 402, 403, 404, and 405 may be caused by a scheduler activating a first behavior of the first agent. Further, the first agent, which may be associated with a digital spatial coordinate, may modify the digital spatial coordinate according to a behavior associated with the first agent. Further still, the agent attribute of the first agent may be an energy attribute. The energy attribute may be added by the modification in step 404.

FIG. 5 depicts another exemplary process according to the invention. Step 501 comprises creating an agent within a digital environment, wherein the agent comprises an algorithm capable of processing data, and wherein the algorithm comprises algorithmic components. Step 502 comprises processing a set of data comprising a feature and an outcome with the algorithm, thereby generating a predicted outcome. Step 503 comprises comparing the predicted outcome to the outcome of the set of data. Step 504 comprises determining, based on the comparison result, whether to generate, based on the algorithmic components and a mutation parameter, a second algorithm capable of processing data.

It will be appreciated that Step 504 may further comprise determining, based on the comparison result, whether to modify an attribute of the first agent, and determining, based on the attribute of the first agent, whether to generate, based on the algorithmic components and the mutation parameter, the second algorithm.

It will also be appreciated that the process depicted in FIG. 5 may further comprise generating, based on the algorithmic components and the mutation parameter, the second algorithm capable of processing data.

It will further be appreciated that the set of data of step 502 may be associated with digital spatial coordinates. For example, another agent may comprise the set of data and digital spatial coordinates.

FIG. 6 depicts another exemplary process according to the invention. Step 601 comprises creating a first and second agent within a digital environment, wherein the first agent comprises a first algorithm capable of processing data and an agent attribute, and the second agent comprises a second algorithm capable of processing data. Step 602 comprises processing a set of data comprising a feature and an outcome with the first algorithm, thereby generating a predicted outcome. Step 603 comprises comparing the predicted outcome to the outcome of the set of data. Step 604 comprises determining, based on the comparison result, whether to modify an attribute of the first agent. Step 605 comprises determining, based on a set of factors comprising the attribute of the first agent, whether to generate a third algorithm based on the first algorithm. It will be appreciated that process of FIG. 6 can additionally include generating the third algorithm based on the first algorithm.

Further, a computer configured to implement the process of FIG. 6 can be capable also of generating the third algorithm based on the first algorithm, the second algorithm, and a mutation parameter. Further, the digital environment may comprise digital spatial coordinates capable of being associated with agents. It will also be appreciated that the set of data may be associated with a set of digital spatial coordinates.

It will be appreciated by one skilled in the art that the invention is not limited to the particular embodiments described herein, and additional embodiments are possible.

What is claimed is:

1. A method for simulating a biological process within an ecological environment through computer modeling, the method comprising the steps of, using an at least one hardware processor:
    creating a first agent and a second agent within a digital environment, wherein the first agent comprises a first algorithm capable of processing data and an agent attribute, and the second agent comprises a second algorithm capable of processing data;
    generating a predicted outcome based on applying the first algorithm to a feature of a set of data, wherein the set of data comprises the feature and an outcome;
    comparing the predicted outcome to the outcome of the set of data;
    modifying an attribute of the first agent based on the comparison; and
    combining, based on the modified attribute of the first agent, the first and the second algorithms to create a third algorithm.

2. The method of claim 1, further comprising the step of associating the first agent with a digital spatial coordinate.

3. The method of claim 1, further comprising the step of running a scheduler, wherein the steps of generating a predicted outcome, comparing the predicted outcome, modifying the attribute of the first agent, and combining the first and second algorithms, are caused by the scheduler instructing the first agent to execute a first agent behavior.

4. The method of claim 1, further comprising the step of associating a behavior with the first agent to occur whenever the digital environment advances a simulated time.

5. The method of claim 3, wherein the step of modifying and energy attribute of the first agent further comprises the step of adding to the attribute if the comparison result is that the predicted outcome and the outcome of the set of data are equal.

6. The method of claim 4, wherein the step of associating a behavior with the first agent comprises the further step of determining whether to modify a digital spatial coordinate associated with the first agent.

7. An algorithmic generator for simulating a biological process within an ecological environment through computer modeling comprising:
    a computing device configured to:
        create a first and second agent within a digital environment, wherein the first agent comprises a first algorithm capable of processing data and an agent attribute, and the second agent comprises a second algorithm capable of processing data;
        process a set of data comprising a feature and an outcome with the first algorithm, thereby generating a predicted outcome;
        compare the predicted outcome to the outcome of the set of data;
        determine, based on the comparison result, whether to modify an attribute of the first agent; and determine, based on a set of factors comprising the attribute of the first agent, whether to generate a third algorithm based on the first algorithm.

8. The algorithmic generator of claim 7, wherein the computing device is capable of generating the third algorithm based on the first algorithm.

9. The algorithmic generator of claim 8, wherein the computing device is capable of generating the third algorithm based on the first algorithm, the second algorithm, and a mutation parameter.

10. The algorithmic generator of claim 7, wherein the digital environment comprises digital spatial coordinates capable of being associated with the first agent.

11. The algorithmic generator of claim 10, wherein the set of data is associated a set of digital spatial coordinates.

12. A method for simulating algorithmic generation, comprising the steps of, using an at least one hardware processor:

creating an agent within a digital environment, wherein the agent comprises an algorithm capable of processing data, and wherein the algorithm comprises algorithmic components;

processing a set of data comprising a feature and an outcome with the algorithm, thereby generating a predicted outcome;

comparing the predicted outcome to the outcome of the set of data; and determining, based on the comparison result, whether to generate, based on the algorithmic components and a mutation parameter, a second algorithm capable of processing data.

13. The method of claim 12, wherein the step of determining, based on the comparison result, whether to generate, based on the algorithmic components and a mutation parameter, a second algorithm further comprises the steps of:

determining, based on the comparison result, whether to modify an attribute of the first agent; and determining, based on the attribute of the first agent, whether to generate, based on the algorithmic components and the mutation parameter, the second algorithm.

14. The method of claim 13, further comprising the step of generating, based on the algorithmic components and the mutation parameter, the second algorithm capable of processing data.

* * * * *